Patented Mar. 31, 1942

2,277,781

UNITED STATES PATENT OFFICE 2,277,781

PROCESS OF MAKING AND RECOVERING TETRAALKYL LEAD

George F. Ruddies, Chicago, Ill.

No Drawing. Application October 1, 1938, Serial No. 232,804

8 Claims. (Cl. 260—437)

The present invention relates to methods of producing alkyl metal compounds, particularly lead alkyls, such as tetraethyl lead.

According to usual methods of preparation, the tetraethyl lead during production and purification is in part decomposed and obtained in decreased yield due to oxidation, steam distillation procedures, and so forth and it often contains by-products or impurities reducing its effectiveness as an anti-knock agent in gasoline or other fuel mixtures.

It is among the objects of the present invention to prepare metal alkyls and particularly tetraethyl lead in increased yields in greater state of purity at reduced cost of production.

Still further objects and advantages will appear in the more detailed description set forth below, it being understood however that this more detailed description is given by way of illustration and explanation only and not by way of limitation, since various changes therein may be made by those skilled in the art without departing from the scope and spirit of the present invention.

In accomplishing the above objects it has been found satisfactory to treat an alkali metal-heavy metal alloy with alkyl halide, preferably in the presence of a hydrogen halide and also in the presence of free halogen.

After the reaction has been completed, the metal alkide which is produced may be readily removed by vacuum distillation and it is not necessary to remove it by steam distillation.

Among the preferred procedures are to combine mono-sodium lead alloy with ethyl chloride in the presence of hydrochloric acid. Bromine may be added at this stage or more preferably subsequently. The atmosphere during the reaction should preferably be hydrogen chloride.

The bromine should always be added slowly and it may be added after the reaction between the ethyl chloride and lead alloy has continued for 10 to 30 minutes, if desired.

Although various proportions may be utilized, it has been found satisfactory according to one embodiment to utilize about 300 parts by weight of the alloy for every 200 to 300 parts by weight of ethyl chloride and for every 10 to 25 parts by weight of bromine. The bromine should be added with constant agitation and cooling.

After this reaction by vacuum distillation it is possible to recover between 300 to 350 parts of the lead tetraethyl.

As a second procedure which is also preferred, lead chloride may be reacted with magnesium ethyl bromide in hydrogen chloride atmosphere and thereafter the reaction mixture may be treated with bromine followed by vacuum distillation. The bromine is added very slowly after the first reaction appears to have completed itself which takes about 5 to 30 minutes. Upon addition of the bromine the reaction is renewed most vigorously and proceeds to final completion.

In this last-mentioned reaction about 500 to 600 parts of the magnesium compound may be utilized for about 300 parts of the lead chloride to produce about 300 to 350 parts of the lead tetraethyl. The bromine may be added in quantities varying from 10 to 25 parts.

In either case the temperature may be maintained between 0 and 12° C. If necessary, cooling means may be provided or the reaction may be controlled by means of the application of dry ice. Even at temperatures as low as −70° C. a satisfactory reaction is obtained upon cooling.

By means of this production of the lead ethide or tetraethyl lead in the presence of a hydrogen chloride atmosphere, a very high yield is obtained of a most pure tetra-alkyl ethide which may be readily incorporated in gasoline.

The vessel in which the lead tetraethyl is produced is generally subjected to a vacuum to remove all air and then hydrogen chloride is introduced to form the atmosphere. Hydro-bromic acid could also be utilized for such atmosphere although it is quite expensive. If desired, chlorine might also be introduced in small quantities, particularly in the latter part of the reaction in addition to or in replacement of the bromine.

The material is free of impurities and by-products which decreases its effectiveness and the vacuum distillation results in the production of a most satisfactory tetra-alkyl lead compound.

The reaction may be carried on under vacuum or under atmospheric pressure or under pressures varying from 15 inches vacuum to 15 to 30 lbs. above atmospheric.

The vacuum distillation may be carried out at various pressures varying from zero to ¾ atmospheric and preferably as near zero as possible.

The tetraethyl lead which is produced may be most readily preserved by the addition thereto of an alkylated aromatic amine, the preferred aromatic amine being aniline.

Although methyl-ethyl, butyl and other alkylated anilines may be employed, it has been found satisfactory to use the benzylated compound, and among the preferred compounds are monobenzyl-para-aminophenol. This compound may be most conveniently added in small amounts to the tetraethyl lead after vacuum distillation, and it is preferably added in amounts varying from .01% to 1.0%.

It has been found most desirable to dissolve this compound in an aliphatic amine before addition, the preferred amines being the alkanol amines, such as ethanolamine and particularly triethanolamine or diamino-propanol.

The solution of monobenzyl-para-aminophenol in triethanolamine forms a surface film on the top of the tetraethyl lead which is very thin and yet gives full protection to the tetraethyl lead. This composition appears to stabilize the tetraethyl lead and to prevent decomposition or deterioration thereof.

At the same time the tetraethyl lead may be removed from below the surface layer when added to gasoline so that none of the protective or stabilizing material will be carried into the gasoline or other fuel which is to be stabilized.

Other amino or hydroxy aromatic compounds may be utilized in lieu of monobenzyl-para-aminophenol and generally the preferred compounds are para-amino or para-hydroxy benzenes or naphthalenes. The solvent for these materials may take the form of other organic aliphatic hydroxy, polyhydroxy or ammohydroxy, polyamino materials which are not soluble in the lead tetraethyl and which will form a definite thin layer upon the surface of the lead tetraethyl when spread thereon without reaction with the lead tetraethyl. These solvents may also be used by themselves to form surface films to protect the tetraethyl lead. These compounds appear to decrease the ionization potential of the lead tetraethyl. Generally ethers and hydrocarbons should not be utilized as the solvent for the para-amino or para-hydroxy compounds or by themselves to form a protective surface layer on the lead tetraethyl.

Lead tetraethyl stabilized in this way is particularly effective, since it appears to give an octane rating as high as 19 without any particular purification operation.

The material which is produced is produced in high yield without loss by oxidation and steam distillation.

Moreover it is not necessary to add a considerable percentage of various addition agents to the gasoline such as ethylene dibromide and so forth, which increase the expense and decrease the antiknock value.

The invention is not intended to be restricted to any particular composition or any particular proportions, nor to any particular ingredients nor to any specific methods of compounding or combining the same, nor to any of the various details thereof, herein described as the same may be modified in various particulars or be applied in many varied relationships without departing from the spirit and scope of the claimed invention, and the practical embodiments herein illustrated and described merely show some of the various features entering into the application of the invention.

What is claimed is:

1. A process of producing a lead alkide which comprises reacting a lead alkali metal alloy compound with an alkyl halide in an atmosphere of a hydrogen halide and in the presence of a minor proportion of bromine.

2. A process of producing a lead ethyl which comprises reacting a lead-sodium alloy in a cooled vessel with an ethyl halide in an atmosphere of a hydrogen halide substantially devoid of oxygen and in the absence of water in the presence of a minor proportion of bromine ranging from about 1/30 to 1/12 of the quantity of the alloy.

3. A process of producing a tetraethyl lead which comprises reacting a sodium lead alloy in a cooled vessel with an ethyl chloride in an atmosphere of a hydrogen chloride substantially devoid of oxygen and in the absence of water in the presence of a minor proportion of bromine ranging from about 1/30 to 1/12 of the quantity of the alloy.

4. A process of making tetra-alkyl lead which comprises reacting together in a cooled vessel a sodium lead alloy and ethyl chloride, causing said reaction to take place in an atmosphere of hydrogen chloride, adding small quantity of bromine to cause completion of the reaction insufficient to cause conversion of the tetraalkyl lead into lead alkyl bromide, and then recovering the tetraalkyl lead by vacuum distillation.

5. A process of making tetra-alkyl lead which comprises reacting together in a cooled vessel a sodium lead alloy and ethyl chloride, adding small quantity of bromine to cause completion of the reaction insufficient to cause conversion of the tetraalkyl lead into lead alkyl bromide, and then recovering the tetra-alkyl lead by vacuum distillation.

6. A method of recovering lead alkyls from reaction mixtures containing the same which comprises providing an atmosphere of hydrogen chloride devoid of oxygen and water subjecting the reaction mixture to vacuum distillation.

7. A method of completing metal alkyl forming reactions in which an alkali metal lead alloy and an alkyl halide are combined with cooling in an atmosphere of a hydrogen halide which comprises adding a relatively small proportion of bromine thereto insufficient to cause reaction of all of the tetraalkyl lead with the bromine to form a lead alkyl bromide.

8. A method of recovering lead tetra-ethyl from reaction mixtures containing the same which comprises subjecting the reaction mixture to vacuum distillation, providing an atmosphere of hydrogen chloride devoid of oxygen and water.

GEORGE F. RUDDIES.